US012729757B2

(12) United States Patent
Yao

(10) Patent No.: US 12,729,757 B2
(45) Date of Patent: Sep. 8, 2026

(54) MOTOR STRUCTURE

(71) Applicant: Li-Ho Yao, Taipei City (TW)

(72) Inventor: Li-Ho Yao, Taipei City (TW)

( * ) Notice: Subject to any disclaimer, the term of this patent is extended or adjusted under 35 U.S.C. 154(b) by 151 days.

(21) Appl. No.: 18/498,045

(22) Filed: Oct. 31, 2023

(65) Prior Publication Data

US 2024/0175484 A1 May 30, 2024

(30) Foreign Application Priority Data

Nov. 30, 2022 (TW) ................................ 111213269

(51) Int. Cl.

*F16H 37/06* (2006.01)
*F16H 57/02* (2012.01)
*F16H 57/035* (2012.01)
*H02K 5/04* (2006.01)
*H02K 7/116* (2006.01)

(52) U.S. Cl.

CPC ........... *F16H 37/06* (2013.01); *F16H 57/035* (2013.01); *H02K 5/04* (2013.01); *H02K 7/116* (2013.01); *F16H 2057/02034* (2013.01); *F16H 2057/02052* (2013.01)

(58) Field of Classification Search

CPC ......... F16H 2057/02034; F16H 57/021; F16H 57/0216; F16H 57/035; H02K 2211/03

See application file for complete search history.

(56) References Cited

U.S. PATENT DOCUMENTS 11,339,854 B2 * 5/2022 Schlager .................. B60K 1/00
2021/0351682 A1 * 11/2021 Mellere ................ H02K 11/215
2022/0250714 A1 * 8/2022 Kuramoto ................ B62M 6/75
2022/0266637 A1 * 8/2022 Lesesky .................. B60C 23/04
2024/0255048 A1 * 8/2024 Häuser .................. F16H 57/025

FOREIGN PATENT DOCUMENTS

WO WO2021172095 A1 * 9/2021 ............... F16H 1/06

OTHER PUBLICATIONS

WO2021172095A1—Translation (Year: 2025).*

* cited by examiner

*Primary Examiner* — Christopher M Koehler
*Assistant Examiner* — Ahmed F Seck
(74) *Attorney, Agent, or Firm* — Leong C. Lei

(57) ABSTRACT

A motor structure includes a drive unit arranged in a housing to be oppositely connected to and fixedly mounted in the housing. The housing includes a first casing member and a second casing member connected together. A support and separation board is arranged and sandwiched between the first and second casing members to support the drive unit to mount thereon. The drive unit includes an electromagnetic device mounted to one side surface of the support and separation board, and a control board having a plurality of electronic components is arranged on one side surface of the support and separation board that is opposite to the electromagnetic device. As such, the structural strength is enhanced and vibration resulting from operation can be spread. The support and separation board separates the electromagnetic device and the control board from each other to reduce interference of the control board by the electromagnetic device.

7 Claims, 6 Drawing Sheets

( A-A )

( B-B )

MOTOR STRUCTURE

BACKGROUND OF THE INVENTION

(a) Technical Field of the Invention

The present invention relates generally to the technical field of motors.

(b) Description of the Prior Art

In a known drive motor structure of an electrical vehicle, an electromagnetic device and a transmission axle are directly mounted on a housing, while a reduction and transmission mechanism is arranged in a loading path between the electromagnetic device and the transmission axle and coupled thereto. The electromagnetic device, when subjected to electromagnetism to operate to drive the transmission axle, is affected by high-speed rotation and loading variation to generate vibration at high frequencies. Being subjected to the vibration of high frequencies, the housing may suffer loosening of fastening elements, so as to cause positional shifting of an axis line of the rotating parts to thereby induce abrasion and thus leading to damage or malfunction of the motor structure. Further, to control the operation and to detect a state of operation, the motor structure is often provided, in the interior thereof, with a control board that includes a plurality of electronic components. However, the control board is not properly protected and the electronic components arranged thereon are susceptible to inference by electrical waves or magnetism of the electromagnetic device, making the control board issuing incorrect instruction or data due to such interference.

In other words, the motor of the known electrical vehicle suffers operation deficiency of easy damage and malfunction caused by the previously discussed insufficiency of supporting strength and susceptibility of the control board to inference.

SUMMARY OF THE INVENTION

The primary objective of the present invention is to a motor structure that effectively enhances the structural strength and stability thereof in order to reduce events of loosening or axis line shifting and abrading resulting from vibration to thereby improve operation safety to further extend the service life of the motor.

The secondary objective of the present invention is to provide a motor structure that allows a control board to be properly protected to reduce interference of electronic components arranged thereto by electrical waves or magnetism of an electromagnetic device in order to reduce normal operation of the motor being influenced by false operations.

DETAILED DESCRIPTION OF THE PREFERRED EMBODIMENTS

Figure 1:
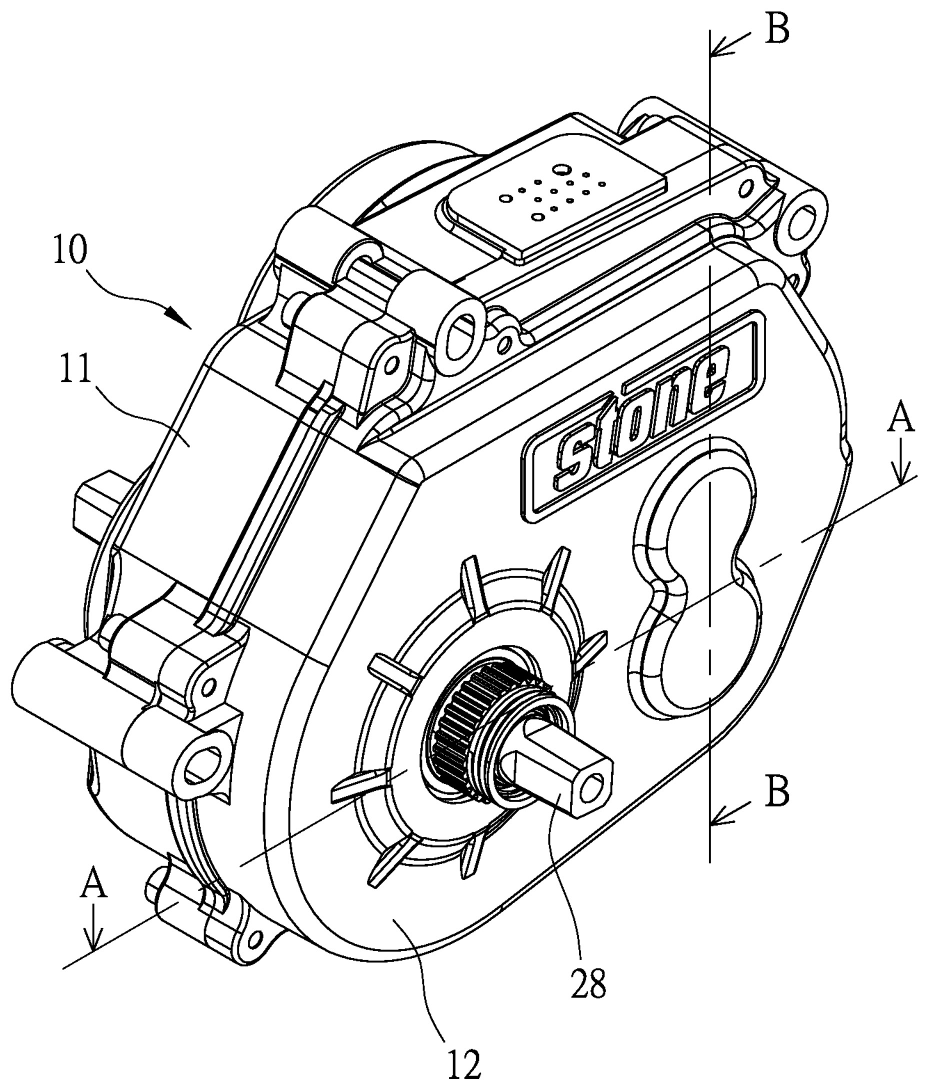
FIG. 1 is a perspective view of the present invention.
Figure 2:
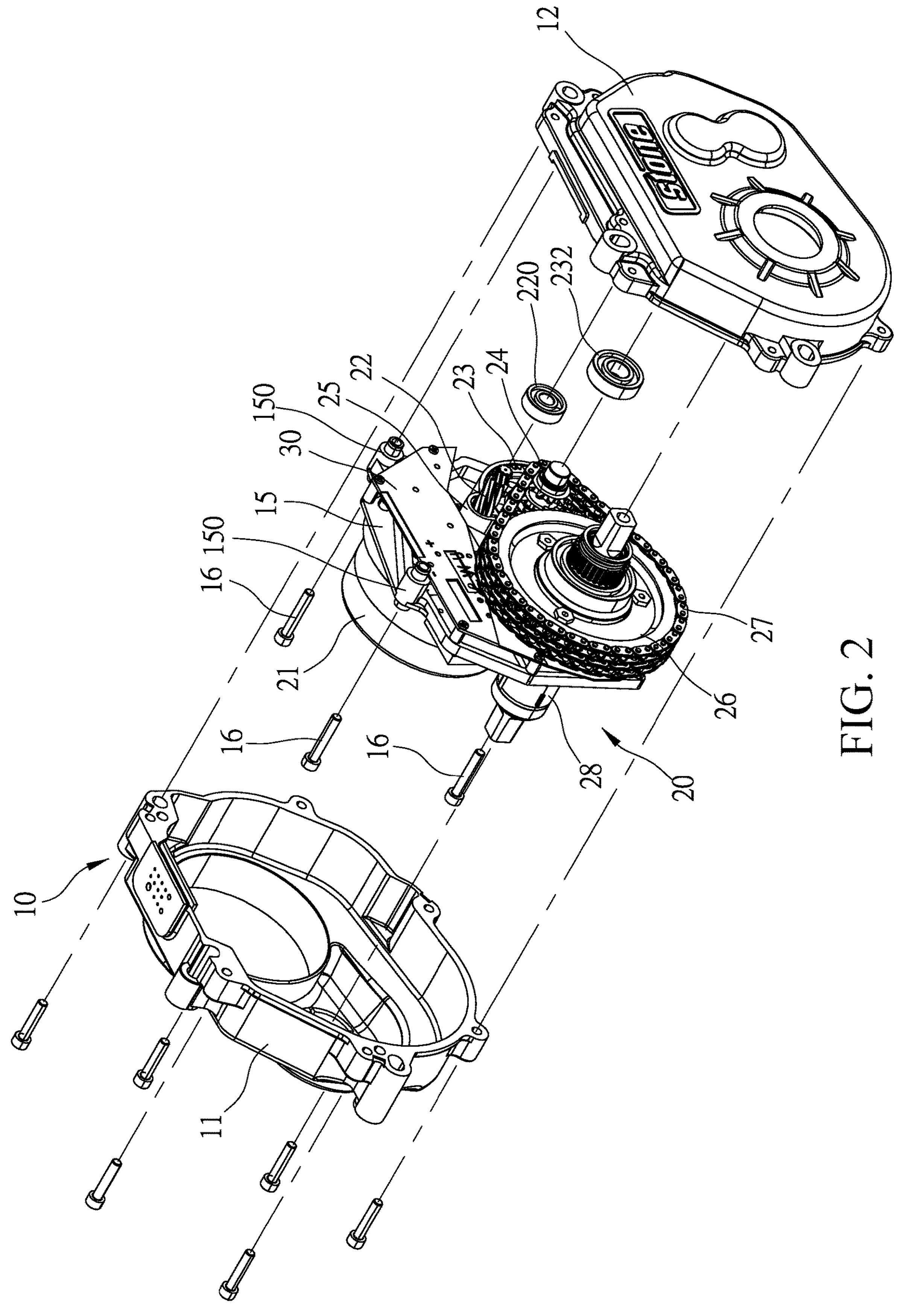
FIG. 2 is an exploded view of the present invention.
Figure 2A:
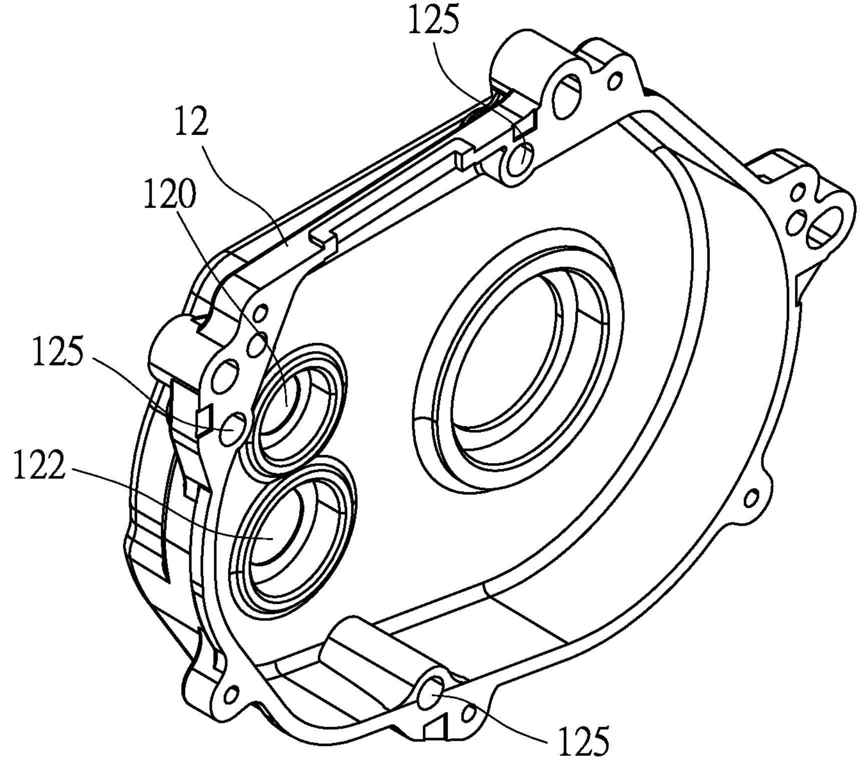
FIG. 2A is a perspective view showing a second casing member of a housing of the present invention.

A motor structure according to the present invention is generally illustrated in FIGS. 1, 2, and 2A, and comprises a drive unit 20 that is arranged in an interior of a housing 10 to be oppositely connected to and fixedly mounted in the housing 10. The housing 10 is formed of a first casing member 11 and a second casing member 12 that are oppositely fastened to and connected with each other. A support and separation board 15 is arranged between the first and second casing members 11, 12 as being sandwiched thereby. The support and separation board 15 has a circumferential edge that is provided with a plurality of fastening barrels 150 each of which has a through hole having two penetrating ends. The second casing member 12 is provided, on an inner side thereof, with a plurality of fastening holes 125 respectively corresponding to the fastening barrels 150 to be each receiving a fastening member 16 penetrating from one side of the support and separation board 15 through a corresponding one of the fastening barrels 150 to connect to the fastening hole 125 of the second casing member 12 (as shown in FIG. 2A), so as to have the support and separation board 15 fastened to the second casing member 12 and sandwiched thereto by the first casing member 11, wherein the support and separation board 15 is provided for mounting and supporting the drive unit 20.

Figure 3:
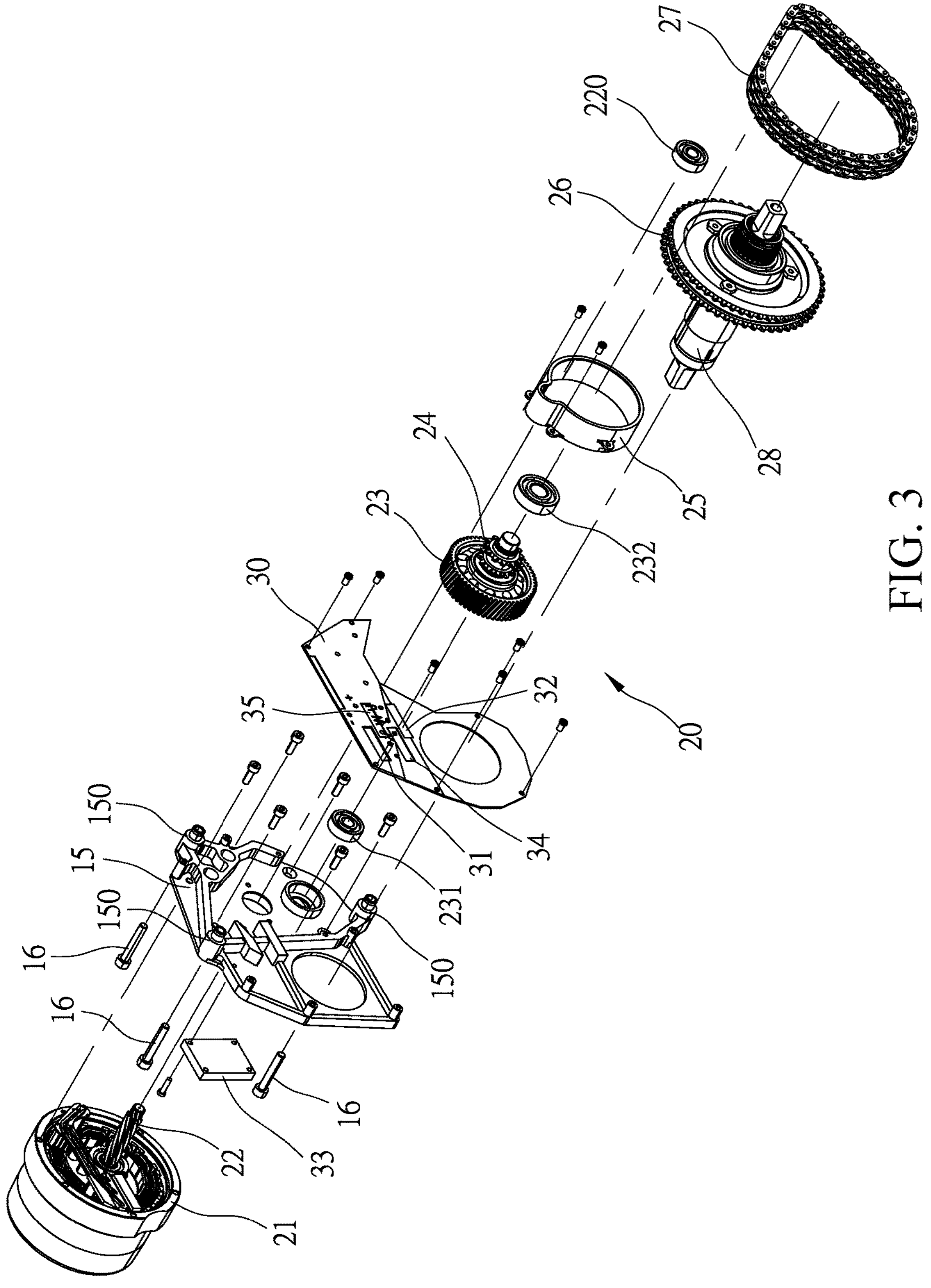
FIG. 3 is an exploded view showing a drive unit of the present invention.
Figure 4:
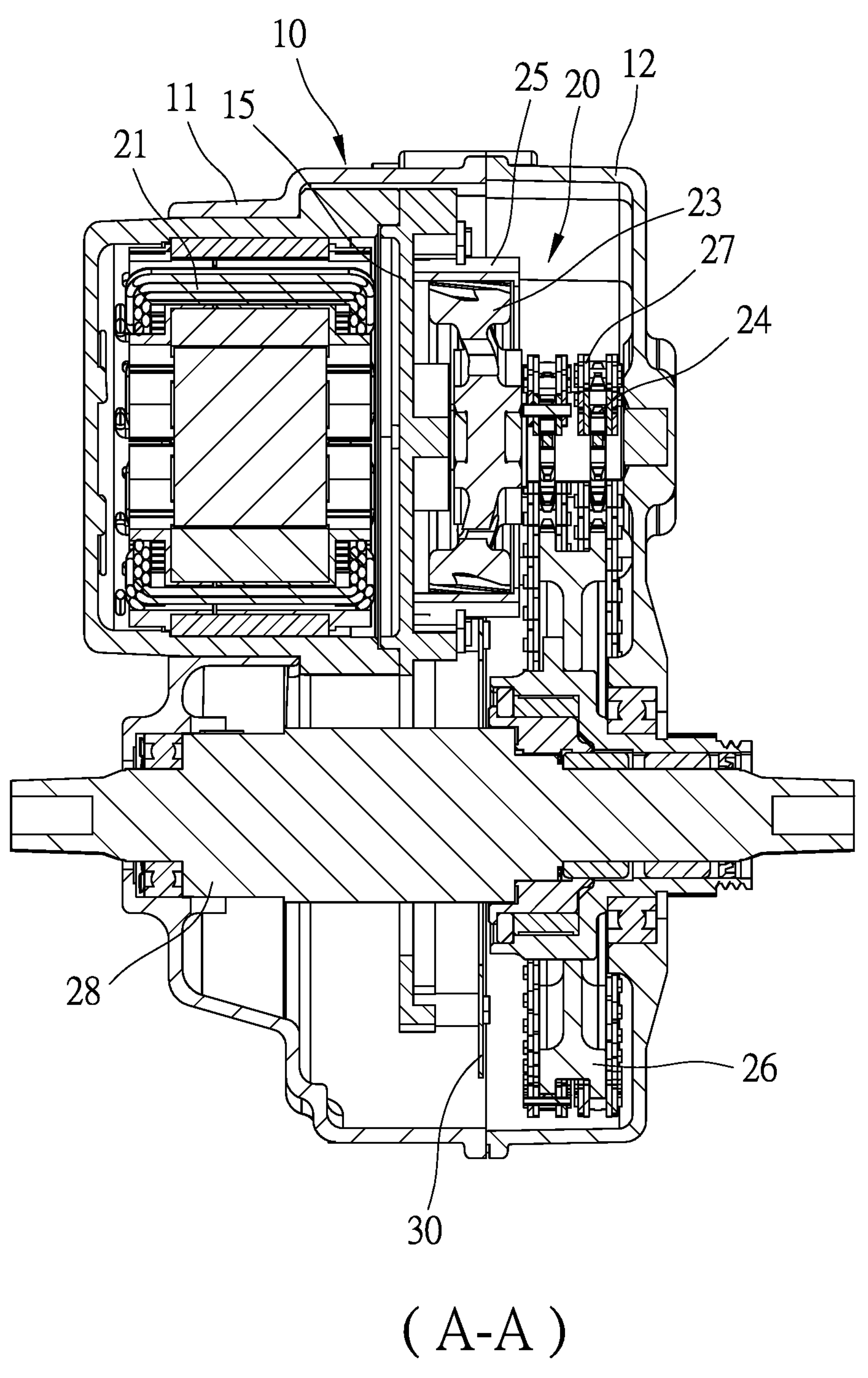
FIG. 4 is a cross-sectional view of the present invention taken along line A-A of FIG. 1.
Figure 5:
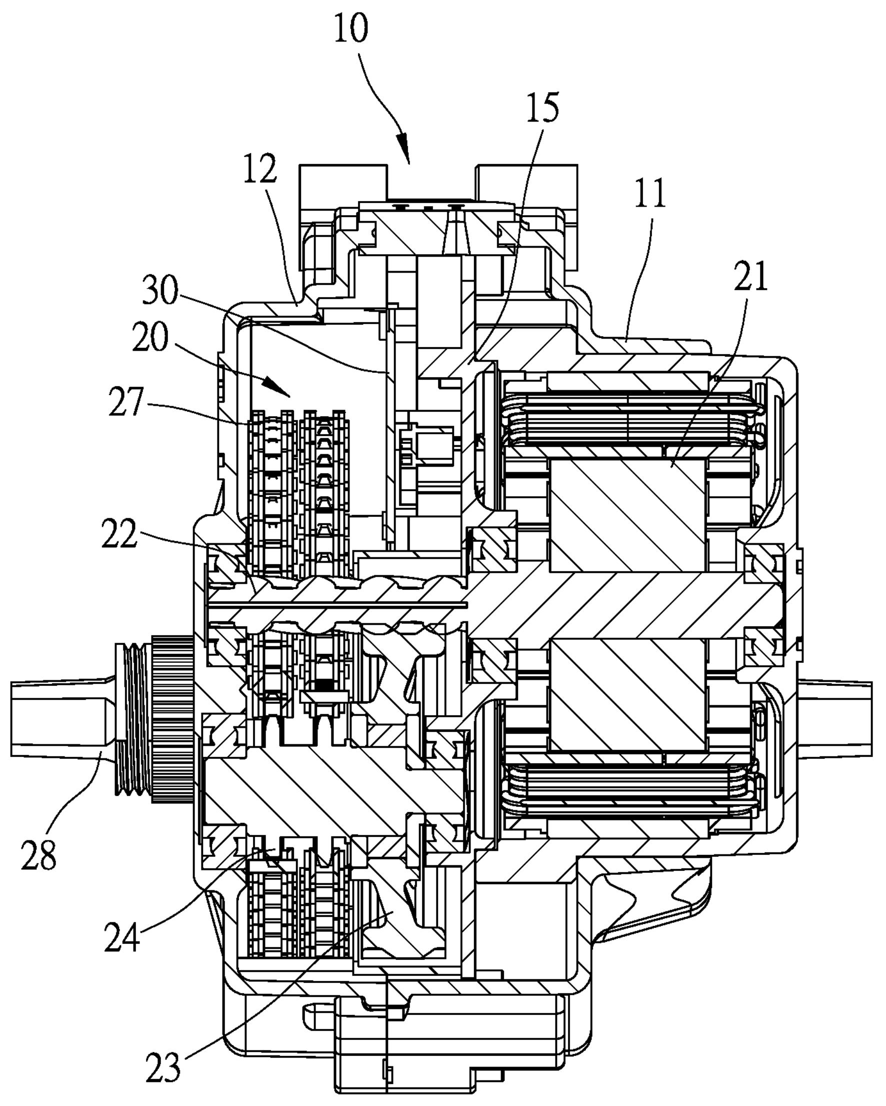
FIG. 5 is a cross-sectional view of the present invention taken along line B-B of FIG. 1.

The drive unit 20 is better shown in FIGS. 3, 4, and 5. The drive unit 20 comprises an electromagnetic device 21 fastened to one side surface of the support and separation board 15. The electromagnetic device 21 comprises an output axle 22 penetrating through the support and separation board 15. Further, the output axle 22 of the electromagnetic device 21 is rotatably mounted to the second casing member 12 that is opposite to the support and separation board 15 by a first bearing 220. The second casing member 12 is provided with a first axle trough 120 (as shown in FIG. 2A) for mounting the first bearing 220. Further, the drive unit 20 comprises a reduction gear 23 that is mounted to one side surface of the support and separation board 15 that is opposite to the electromagnetic device 21 and is in mating engagement with and driven by the output axle 22. Two opposite ends of the reduction gear 23 are synchronously and rotatably supported on the support and separation board 15 and the second casing member 12 opposite thereto by means of a second bearing 231 and a third bearing 232, respectively. The second casing member 12 is provided with a second axle trough 122 (as shown in FIG. 2A) for mounting the third bearing 232 in order to ensure stable mating engagement and smooth operation between the output axle 22 and the reduction gear 23. Further, the support and separation board 15 is provided with a protection frame 25 mounted thereto at a location corresponding to where the output axle 22 and the reduction gear 23 engage with each other to provide an effect of protection and reduction of foreign objects falling therein. Further, the reduction gear 23 comprises a first drive wheel 24 coaxially rotatable therewith. A transmission axle 28 is arranged between the first and second casing members 11, 12 to transmit power to outside of the housing 10, and the transmission axle 28 penetrates through the support and separation board 15. Further, the transmission axle 28 is provided with a second drive wheel 26 at a location corresponding to the first drive wheel 24 of the reduction gear 23, wherein the second drive wheel 26 is coaxially and synchronously rotatable with the transmission axle 28. At least one drive member 27 is arranged between and loops around the first and second drive wheels 24, 26, so that the reduction gear 23 may drive the transmission axle 28 by means of the drive member 27. Further, the first and second drive wheels 24, 26 and the drive member 27 can be selected as chain wheels and a chain, or pulleys and a belt. The first drive wheel 24 and the second drive wheel 26 may be set to have different ratios between diameters thereof to change a ratio of speeds thereof. The reduction gear 23, the first drive wheel 24, the second drive wheel, 26 and the drive member 27 jointly form a reduction and transmission mechanism of a loading path between the output axle 22 and the transmission axle 28.

Further, the housing 10 is provided, in the interior thereof, with a control board 30 that issues operation instructions and data, wherein the control board 30 at least comprises a microprocessor 31, and at least one sensor 32, at least one global positioning system (GPS) device 33, at least one transmission device 34, and at least one operation module 35 that are in connection with the microprocessor 31 for motor operation control, motor operation state detection, distance detection, carbon emission calculation, and data transmission, respectively. The control board 30 is arranged on one side surface of the support and separation board 15 that is opposite to the electromagnetic device 21, so that interference of the control board 30 by the electromagnetic device 21 on the opposite side of the support and separation board 15 can be reduced.

As such, the electromagnetic device 21 of the motor utilizes electromagnetism to make the output axle 22, which serves as a rotor, rotating at a high speed, which is then converted by the reduction and transmission mechanism to an increased torque for subsequently drive the transmission axle 28 that transmits the power to the outside of the housing 10, so as to allow the motor to drive an electrical vehicle to move, and as such, a motor structure that has a good structural strength and is not easily interfered with is formed.

By means of the previously discussed structural arrangement, in a practical application of the present invention, as shown in FIGS. 2, 4, and 5, when the drive unit of the motor is operating the transmission axle 28 to transmit power to the outside, since the support and separation board 15 is arranged and sandwiched between the first and second casing members 11, 12 of the housing 10, the output axle 22 of the drive unit 20 and the reduction gear 23 of the reduction and transmission mechanism are jointly connected to the housing 10 and the support and separation board 15, and thus, the housing 10 is effectively supported and high-frequency vibration caused by the high-speed operation of the electromagnetic device 21 of the drive unit 20 can be effectively distributed and absorbed to thereby reduce vibration and noise, so as to reduce events of loosening or axis line shifting resulting from high-frequency vibration and effectively reduce abrasion and failure of the rotating parts to thus extend the service life of the motor.

Further, the support and separation board 15 arranged in the interior of the housing can separate the electromagnetic device 21 and the control board 30 of the drive unit from each other, so that electrical wave or magnetism of the electromagnetic device 21 interfering with the microprocessor 31, the sensor 32, the GPS device 33, the transmission device 34, or the operation module 35 arranged on the control board 30 can be reduce to thereby reduce occurrence of false operations.

It is known from the above description that the motor structure of the present invention utilizes the arrangement that the support and separation board 15 is arranged and sandwiched in the interior of the housing 10 and the support and separation board jointly supports the drive unit 20 and the reduction and transmission mechanism in the interior of the housing 10, so as to effectively enhance the structural strength and stability to effectively spread vibration of the operation thereof to reduce events of loosening or axis line shifting and abrading, and further, the support and separation board 15 is arranged to separate the electromagnetic device 21 and the control board 30 of the drive unit 20 to thereby provide certain protection to the control board 30 to reduce interference of the electrical components thereof by electrical waves or magnetism of the electromagnetic device 21 to reduce motor being influenced with respect to normal operation thereof by false operations, so as to greatly enhance practical utilization thereof.

I claim:

1. A motor structure, comprising:

a housing, which is formed of a first casing member and a second casing member that are fastened to and connected with each other, a support and separation board being arranged and clamped between the first and second casing members; and a drive unit, which is arranged between the first and second casing members of the housing and is supported by the support and separation board, the drive unit comprising an electromagnetic device mounted to one side surface of the support and separation board, the electromagnetic device comprising an output axle penetrating through the support and separation board, a transmission axle being arranged between the first and second casing members of the housing for transmitting power to outside of the housing, the transmission axle penetrating through the support and separation board, a reduction and transmission mechanism being arranged in a loading path between the output axle of the electromagnetic device and the transmission axle;

wherein the output axle of the electromagnetic device is rotatably mounted by a first bearing to the second casing member that is opposite to the support and separation board, and the second casing member comprises a first axle trough corresponding to and mounting the first bearing; and wherein a control board is arranged in an interior of the housing, and the control board is arranged on one side surface of the support and separation board that is opposite to the electromagnetic device.

2. The motor structure according to claim 1, wherein the support and separation board has a circumferential edge that is provided with a plurality of fastening barrels having a through hole and two penetrating ends, and the second casing member is provided, on an inner side, with a plurality of fastening holes respectively corresponding to the fastening barrels to each receive a fastening member penetrating from one side of the support and separation board through a corresponding one of the fastening barrels to fix to the fastening hole of the second casing member.

3. The motor structure according to claim 1, wherein the reduction and transmission mechanism comprises a reduction gear arranged on one side surface of the support and separation board that is opposite to the electromagnetic device to be in mating engagement with and driven by the output axle; and the reduction gear comprises a first drive wheel coaxially rotatable therewith, and the transmission axle is provided with a second drive wheel corresponding to the first drive wheel, and a drive member is arranged between the first and second drive wheels to establish a transmission arrangement, wherein a rotational speed ratio between the output axle and the transmission axle is variable by means of a change of a diameter ratio between the reduction gear and the first drive wheel and between the first drive wheel and the second drive wheel.

4. The motor structure according to claim 3, wherein two ends of the reduction gear are synchronously and rotatably mounted on the support and separation board and the second casing member by a second bearing and a third bearing respectively, and the second casing member comprises a second axle trough to mount the third bearing.

5. The motor structure according to claim 3, wherein the support and separation board comprises a protection frame mounted thereto at a location corresponding to where the output axle and the reduction gear are set in mating engagement with each other.

6. The motor structure according to claim 3, wherein the first and second drive wheels and the drive member are respectively chain wheels and a chain.

7. The motor structure according to claim 1, wherein the control board at least comprises a microprocessor, and at least one sensor, at least one global positioning system (GPS) device, at least one transmission device, and at least one operation module in connection with the microprocessor.

* * * * *